United States Patent [19]

Takahashi et al.

[11] Patent Number: 4,853,924
[45] Date of Patent: Aug. 1, 1989

[54] DISK CLAMPING DEVICE

[75] Inventors: Junji Takahashi; Isami Kenmotsu, both of Saitama, Japan

[73] Assignee: Pioneer Electronic Corporation, Tokyo, Japan

[21] Appl. No.: 203,833

[22] Filed: Jun. 8, 1988

[30] Foreign Application Priority Data

Aug. 28, 1987 [JP] Japan .................. 62-215973

[51] Int. Cl.⁴ ............................. G11B 17/028
[52] U.S. Cl. .................. 369/270; 360/99.12
[58] Field of Search ............. 369/270, 271; 360/99.12

[56] References Cited

U.S. PATENT DOCUMENTS

| | | | |
|---|---|---|---|
| 3,891,796 | 6/1975 | Takahara et al. | 369/270 |
| 4,510,592 | 4/1985 | Kanamara et al. | 369/270 |
| 4,539,671 | 9/1985 | Higashihara | 369/75.1 |

FOREIGN PATENT DOCUMENTS

| | | | |
|---|---|---|---|
| 247850 | 12/1985 | Japan | 369/270 |
| 281154 | 12/1987 | Japan | 369/270 |
| 2146830 | 4/1985 | United Kingdom | 369/270 |

Primary Examiner—Steven L. Stephan
Attorney, Agent, or Firm—Sughrue, Mion, Zinn, Macpeak & Seas

[57] ABSTRACT

A disk clamping device for a compatible disk player capable of playing both compact disks and video disks in which the clamping force for the thicker video disk is greater than that for the thinner compact disk. The clamping device includes a turntable for mounting a selected one of a video disk and a compact disk, a hub for centering the disk mounted on the turntable, a clamper having a first surface for pressing the video disk and a second surface projecting in a clamping direction further than the first surface for pressing the compact disk, and a magnet constituting at least a part of the second surface of the clamper or the turntable for generating a force urging the clamper against the turntable.

6 Claims, 1 Drawing Sheet

4,853,924

DISK CLAMPING DEVICE

BACKGROUND OF THE INVENTION

The present invention relates to a disk clamping device suitable for use in a disk player capable of reproducing a selected alternative one of a compact disk and a video disk.

Optical systems for reproducing a compact disk and an optical video disk have the same general arrangement. So-called compatible disk players capable of playing either a compact disk or an optical video disk have been developed and marketed. A compact disk has a small thickness and relatively small outer diameter and center hole diameter compared with a video disk. A video disk thus has a much larger mass than a compact disk.

One type of conventional compatible disk player has been provided with separate turntables for playing compact and video disks, while a single pickup is used commonly for the two types of disk. This disk player, however, has a generally very complicated structure. For this reason, a compatible disk player employing only a single turntable has been developed.

In such a conventional disk player employing a single turntable for both types of disks, the same pressing surface of a magnetic clamper is used for pressing and clamping both types of disk against the turntable. However, due to the difference in thickness between compact and video disks and the resulting difference in distance between the clamper and associated magnet, the clamping force for a video disk is significantly weaker than for a compact disk, even though the video disk is of much greater mass than the compact disk and thus actually should be clamped with a greater clamping force.

SUMMARY OF THE INVENTION

Accordingly, it is an object of the present invention to provide a disk clamping device with which the clamping force for clamping a thick disk is greater than that for clamping a thin disk.

This, as well as other objects of the present invention, are met by a disk clamping device comprising a turntable for mounting a selected disk type thereon, namely, a first disk having a greater thickness than the second disk, a hub for centering the disk mounted on the turntable, a clamper having a first surface for pressing the first disk and a second surface, which projects in a clamping direction further than the first surface, for pressing the second disk, and a magnet constituting at least a part of a second surface of the clamper or the turntable for generating a force urging the clamper against the turntable.

A selected one of the first and second type disks is mounted on the common turntable and centered with the hub. Due to the fact that the second surface of the clamper projects further in the clamping direction than the first surface and due to the fact that at least a part of either the second surface of the clamper or the turntable is constituted by a magnet, if the disk is of the first type, the attractive magnetic force between the second surface of the clamper and the turntable firmly clamps the disk to the turntable. That is, in the case of the thick disk of the first type, the second surface is closer to the turntable than for the thin disk of the second type. As a result, the force for clamping the first disk to the turntable is greater than the force for clamping the second disk.

DESCRIPTION OF THE PREFERRED EMBODIMENTS

Preferred embodiments of the present invention will now be described with reference to FIGS. 1 and 2 of the attached drawings.

Figure 2:
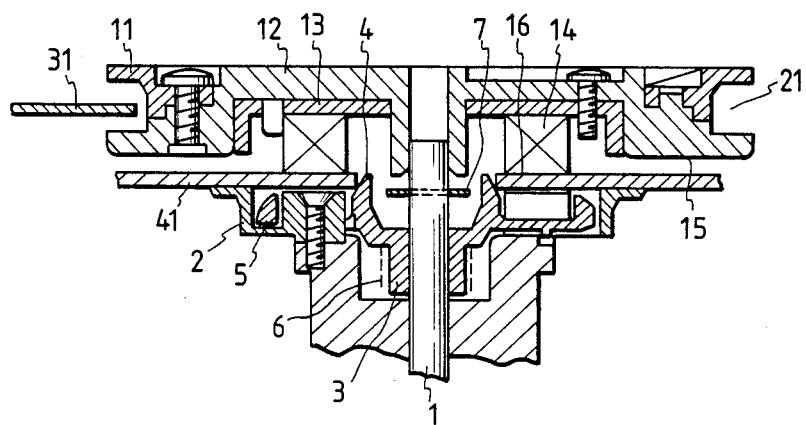
FIG. 2 is a view similar to FIG. 1 but illustrating the case where a compact disk is clamped to the turntable.

FIG. 2 is a sectional view showing a disk clamping device of the invention in the case where a compact disk is clamped to the turntable. In FIG. 2, reference numeral 1 designates a spindle which is rotated by a spindle motor (not shown). A centering hub 3 is provided with conical portions 4 and 5 which contact the center holes of a compact disk and a video disk, respectively. The hub 3, which is slidably mounted on the spindle 1, is urged upward in the drawing by a spring 6 against a stopper 7 fixed to the spindle 1.

Reference numeral 11 designates a clamper head, a clamper 12 being fixed to the lower portion of the clamper head 11. A yoke 13 is fixed to the lower portion of the clamper 12, and a magnet 14 is fixed to the lower portion of the yoke 13. A recess 21 is formed in the outer circumferential portion of the assembly of the foregoing members, and a clamper holder 31 supports the assembly at the recess portion 21.

If a compact disk 41 is mounted on the turntable 2, the center hole of the compact disk 41 contacts the conical portion 4. The conical portion 4 is pressed by the disk 41 and forced downward against the force of the spring 6 so that the disk 41 is centered.

The clamper holder 31 retaining the clamper 12 is moved downward until the lower surface of the magnet 14 abuts the disk 41. The attractive force between the magnet 14 and the turntable 2 acts as a clamping force so that the disk 41 is pressed and clamped against the turntable.

Figure 1:
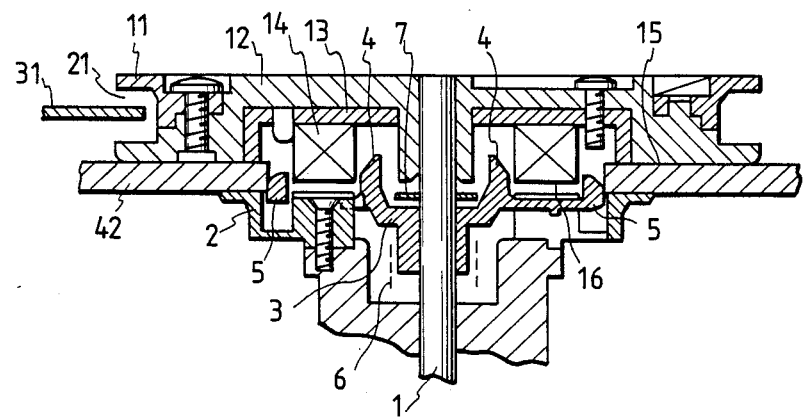
FIG. 1 is a sectional view of a disk clamping device constructed in accordance with the present invention showing the state in which a video disk is clamped to the turntable.

FIG. 1 illustrates the case of clamping a video disk. The diameter of the center hole of a video disk 42 is larger than that of the compact disk 41. The video disk 42 is therefore centered by the conical portion 5 having a diameter larger than that of the conical portion 4. When the clamper 12 is moved downward, its lower surface 15 abuts the disk 42.

In the case of the video disk, the magnet 14 is positioned within the center hole of the disk 42 between the conical portions 4 and 5 so that the magnet does not abut the disk and the conical portions.

The lower surface 16 of the magnet projects in the clamping direction (downward in the drawings) by a distance H from the lower surface 15 of the clamper 12. The distance H is set so as to satisfy the following condition:

$$D_1 - D_2 < H < D_1,$$

where $D_1$ and $D_2$ represent the thicknesses of the video disk 42 and compact disk 41, respectively. The distance $D_1 - H$ between the magnet 14 and the turntable 2 when a video disk 42 is clamped is therefore smaller than that ($D_2$) when a compact disk 41 is clamped since $D_1-H<D_2$. Being inversely proportional to the square of distance, the magnetic clamping force is larger for the case of a video disk than for a compact disk, thereby satisfying the requirement of providing a larger clamping force in the case of the more massive video disk.

Although the magnet 14 is provided on the clamper side in the embodiment discussed above, the clamping device may be modified so that the surface 16 is formed with a magnetic material or a magnetic material is fixed thereto and the magnet 14 is disposed on the side of the turntable 2 in such a manner as to attract the surface 16.

According to the invention as described above, a first surface for pressing a thick disk and a second surface for pressing a thin disk are formed on the clamper, and a magnet for generating a clamping force is disposed on the second surface. As a result, the clamping force is greater in the case of the thick disk than for the thin disk.

What is claimed is:

1. A disk clamping device comprising: a turntable for mounting a selected one of a first disk and a second disk, said first disk having a greater thickness than said second disk, a hub for centering the disk mounted on said turntable, a clamper having a first surface for pressing said first disk and a second surface parallel to said first surface projecting in a clamping direction further than said first surface for pressing said second disk, and a magnet constituting at least a part of at least one of said second surface of said clamper and a surface of said turntable for generating a force urging said clamper against said turntable.

2. The disk clamping device of claim 1, wherein said second surface is disposed inside a center hole of said first disk and outside a center hole of said second disk.

3. The disk clamping device of claim 1, wherein a distance H by which said second surface projects beyond said first surface satisfies:

$$D_1-D_2<H<D_1$$

where $D_1$ is a thickness of said first disk and $D_2$ is a thickness of said second disk.

4. The disk clamping device of claim 1, wherein said magnet comprises at least a part of said second surface of said clamper.

5. The disk clamping device of claim 1, wherein said magnet comprises at least a part of said surface of said turntable.

6. The disk clamping device of claim 1, wherein said magnet comprises at least a portion of said second surface of said clamper and projects into a center hole of said first disk so as to be closer to said turntable when said first disk is clamped such that said force generated by said magnet is greater in the case of said first disk than for said second disk.

* * * * *